Aug. 17, 1954
C. C. HERITAGE ET AL
2,686,461
METHOD OF MANUFACTURING ACOUSTIC FIBERBOARD
BY PERFORATING WET FIBER MAT
Filed Sept. 23, 1948
2 Sheets-Sheet 2
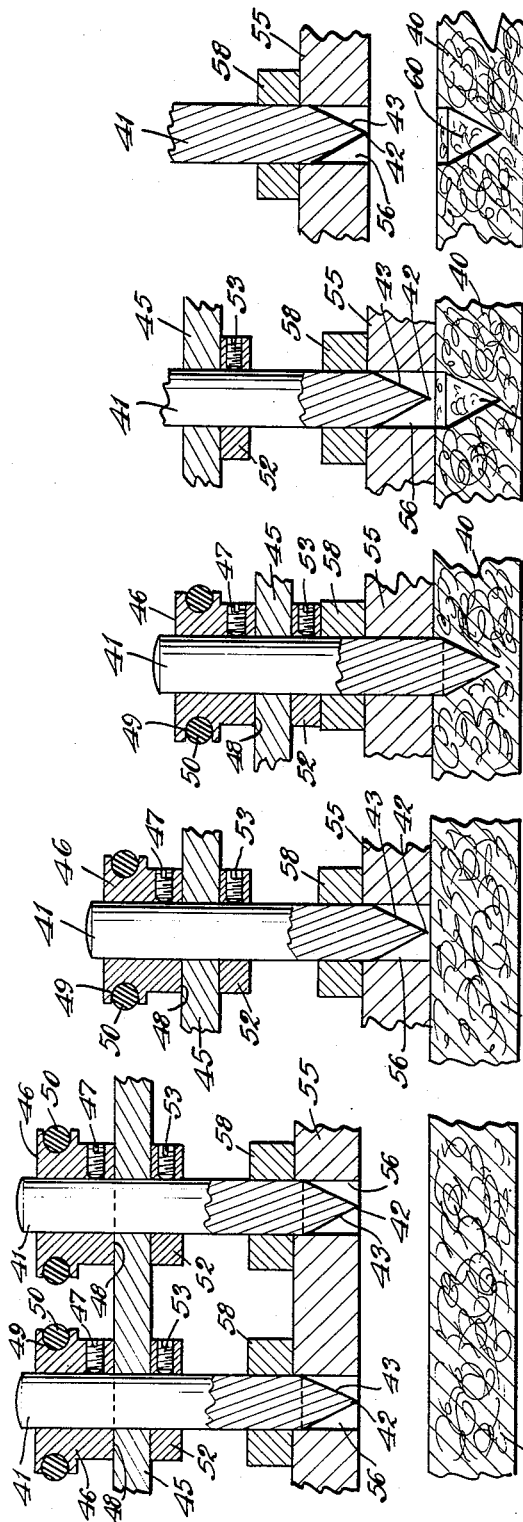
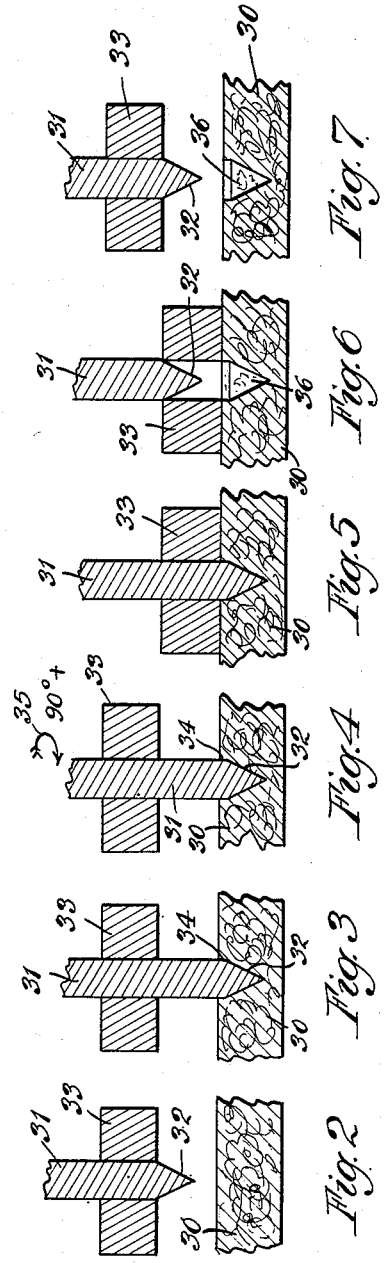
Inventors
Clark C. Heritage
George W. Thomas
by W. Bartlett Jones,
Attorney.

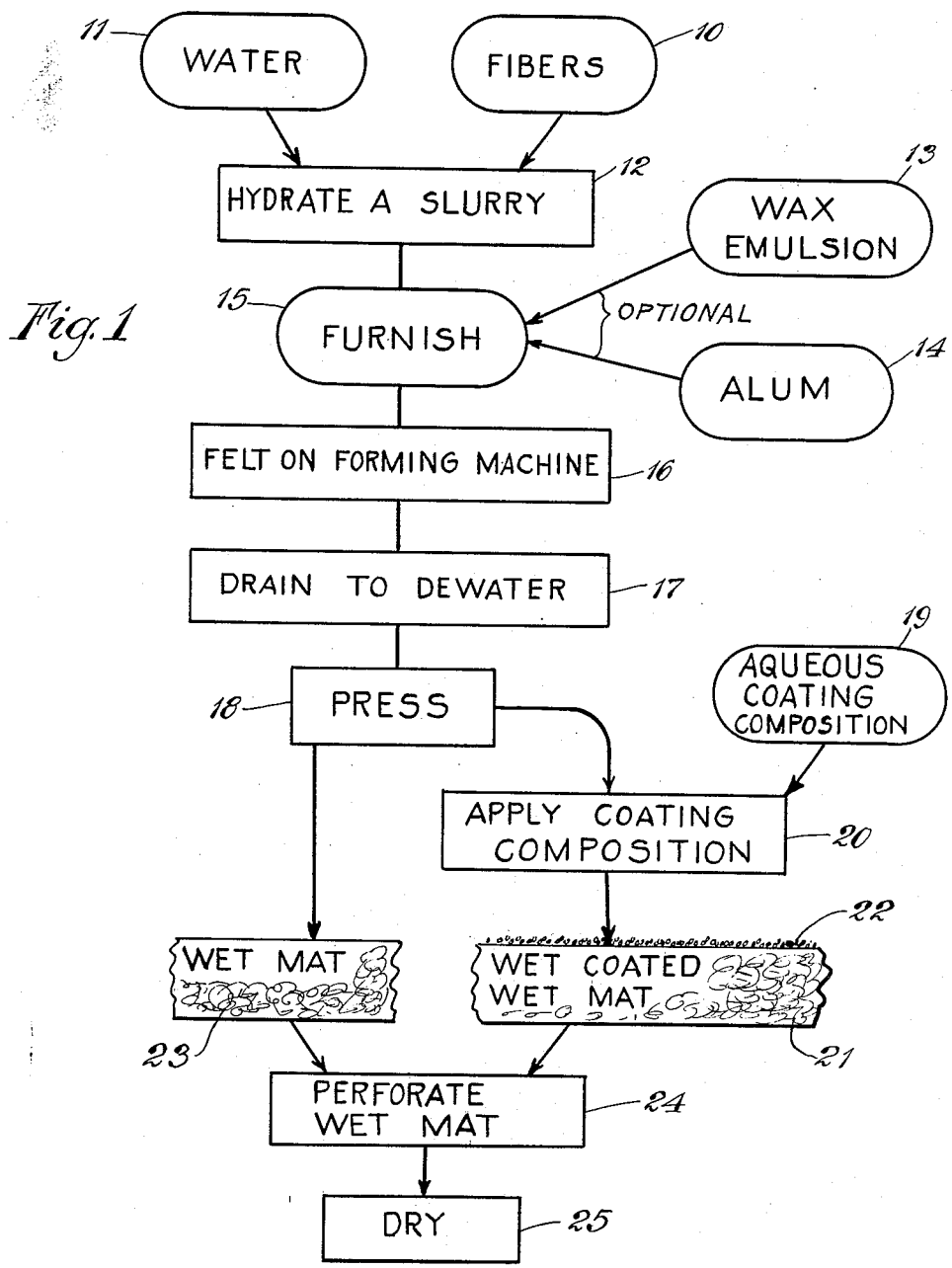

Patented Aug. 17, 1954

2,686,461

UNITED STATES PATENT OFFICE 2,686,461

METHOD OF MANUFACTURING ACOUSTIC FIBERBOARD BY PERFORATING WET FIBER MAT

Clark C. Heritage and George W. Thomas, Cloquet, Minn., assignors to Wood Conversion Company, St. Paul, Minn., a corporation of Delaware Application September 23, 1948, Serial No. 50,738

9 Claims. (Cl. 92—39)

The present invention relates generally to the formation of acoustic fiber board and more particularly the type having a multiplicity of holes or perforations into the body of the board.

This type of acoustical board is well known. In general, it is rigid material, commonly of felted fibers, of open and porous character to give it sound absorbing properties. Such fiber boards are represented by the type known as insulating board. Unperforated forms of such porous structural board have sound absorbing properties by reason of the internal porosity, when the face is also porous for receiving sound waves. To the extent that surface pores are closed, the sound absorbing properties of such structures are lessened. Where such insulating types of structural boards, normally porous, are so coated over the surface that the pores are closed, the internal porosity does not function acoustically to any great extent. Heretofore, such surface sealed boards have been rendered acoustically valuable by a multiplicity of openings through the surface to the porous interior. Also, such boards not so sealed at the surface have been acoustically improved in a like manner by forming a multiplicity of holes from the surface to the porous interior thereof.

Heretofore, such holes have been formed in such boards by mechanical operations on the dry board, for example, by drilling holes into the board, or by punching the holes therein. Such operations are costly, particularly in the maintenance of drills or punches, which are quickly dulled by continued use. This is more especially true where the board so punched or drilled is previously coated with a coating composition, such as one containing mineral pigments. Also, in punching or drilling coated dry board of which the pigmented surface is brittle or otherwise subject to chipping, the edge of the hole is frequently chipped to a noticeable degree. Such chipping renders the section unserviceable for decorative purposes, and a considerable amount of waste thus results.

The present invention aims to form acoustical holes in porous rigid fiber board in a more efficient manner, which does not result in wear or call for maintenance of the tools, as does the dry method, and which avoid unnecessary waste through chipping at the edges of the holes, as above described.

It is the general object of the present invention to form acoustical holes in a wet fiber mat during the process of forming a dry structural fiber board.

It is a particular object of the invention to form a wet structural-board-forming mat which is such as will dry to a rigid board, and to displace the fibers in the wet mat by a suitable method and means of penetration to form the desired multiplicity of holes.

It is a particular object of the invention to apply an aqueous coating composition to a wet structural-board-forming mat which is suitable for drying to form a coated rigid board, to penetrate the undried coated mat with a multiplicity of pointed devices for forming acoustical holes before drying of the board, and to preserve the holes and the mat in desired form by controlled methods of withdrawing the penetrating tools.

It is also an object of the invention to provide means for producing acoustic holes in a suitable wet mat of the character described.

Various other and ancillary objects and advantages of the invention will become apparent from the following description and explanation of the invention, given in connection with the accompanying drawings illustrating the nature of the process and of suitable means for carrying out the process.

Fig. 1 is a diagrammatic presentation of processing steps to form a wet uncoated mat or a wet coated wet mat for practice of the invention.

Figs. 2 through 7 constitute a series of views showing the manner in which a pin penetrates a wet mat and is then withdrawn therefrom, including in Fig. 2 the positioning of the pin above the mat before penetration and in Fig. 7 the withdrawal of the pin to initial position after penetration.

Fig. 3 shows the pin at the depth of penetration.

Fig. 4 shows the pin rotated before withdrawal and at the depth of penetration.

Fig. 5 shows the surface holding collar for the mat in holding position before withdrawal of the pin.

Fig. 6 shows the pin withdrawn through the collar still in holding position.

Fig. 7 shows a return to the position of Fig. 2, leaving the formed hole in the board.

Figs. 8 through 12 constitute a series illustrating the operation of penetrating the mat with a gang of rotating pins, and the arrangement of the parts.

Fig. 8 is a broken view showing, in cross-section, two pins and the mounting therefor.

Figs. 9, 10, 11 and 12 are partial views, in cross-section, showing the sequence of movements for one of the pins shown in Fig. 8.

Fiber boards of the type commonly used for acoustical coverings on walls or ceilings, when suitably perforated, may be made by the same processes as conventionally employed for forming low density structural board, commonly known as insulating board. This generally ranges in density from about 10 lbs. to 30 lbs. per cu. ft. when made of cellulosic fibers. The predominating types found in the market today have a density in the vicinity of 17 lbs. per cu. ft. and have a thickness of approximately ½ inch as a single felted layer, or thicker where the structure is a laminated one. These boards are available in uncoated form, and in forms variously coated with pigments for decorative purposes and also for completely covering and hiding the surfaces of lignocellulose fibers in the board, thereby to avoid color change in the surface of the board resulting from the action of time and light on exposed lignocellulosic substance of the fibers.

Methods of forming such board, and of applying suitable covering or coating compositions in the wet portion of the process during the manufacture of the board, are to be found in the United States patents to Heritage No. 2,409,628 and No. 2,409,629, and also in the patent to Heritage and Walter No. 2,409,630. According to Patent No. 2,409,628 a wet structural-board-forming mat is formed as a felted structure at a suitable density so that when dry it forms a porous rigid fiber board, suitable as insulating or structural board. The preferred method of forming such a wet board-forming mat is to suspend vegetable fibers in water in a conventional manner and to felt the slurry on a suitable forming machine to form a thick mat, which is then dewatered and pressed to a sheet having a thickness and fiber content suitable for drying to a board of the desired density. The fibers employed may be derived from lignocellulosic materials such as bagasse, straw and various kinds of wood. Conventionally, a suitable binder is present in the slurry to bind the fibers together. The binder may be added material such as starch or other adhesive or gelatinous substance. The binder may be a gel mass resulting from completely gelatinizing cellulose or lignocellulose. Conventionally, the binder is provided as the well-known paper maker's bond, resulting from suitable refining or hydrating of some or all of the fibers to constitute the board. The fibers so to be felted into the wet mat may be subjected to treatment for including water-resisting or fire-resisting agents in the resulting board. As set forth in No. 2,409,628 a water-resisting treatment may be effected by including in the slurry emulsified wax, such as paraffin, which is precipitated by adding to the slurry a suitable agent, such as alum, to deposit wax particles on the suspended fibers. In heating to dry a wet mat carrying such wax-treated fibers, the wax is melted by the heat to spread it through the fibers and give water-resistance to the extent that wax is provided.

The particular objective of the above three mentioned patents is the application of an aqueous coating composition to the wet mat to be dried, so that upon drying the coated wet mat the resulting board is a coated board. Numerous examples of aqueous coating compositions containing a variety of pigments and of binders are given in the said patents.

The present invention involves the formation of holes in such wet mats before drying of the same to form the board, and the present invention may be applied to uncoated wet mats, and to the coated wet mats as referred to above. It may be practiced on uncoated wet mats, and then the coating may be applied after perforating and before drying, in accordance with methods described in said patents. The present process may be practiced on already coated wet mats without interfering with the function of the wet coat.

A wet mat of character to be dried to form the insulating or structural porous fiber board may be readily penetrated with a suitable pointed smooth surfaced object, hereinafter referred to as a "pin," to provide a suitable acoustic hole. The pin should be tapered over substantially all of its penetrating extent so that the hole is generally tapered, and so that the pin may be readily withdrawn. In so penetrating such a wet mat, the fibers are displaced by application of a lateral pressure from the tapered character of the pin. As a result, there is a tendency for fibers to stick to the tapered surface, assuming the pin to be otherwise static. This is more pronounced where there is a coating composition on the surface penetrated, which composition yields some of its adhesive binder to the pin which carries it inwardly along the interface of the pin and the hole being formed. It has been found that a static pin so inserted into a wet mat may not be simply withdrawn from its depth of penetration, without disrupting the structure of the mat. The top layer of the wet mat to a depth of approximately $\frac{1}{16}$ to $\frac{3}{32}$ inch tends to delaminate from the underlying wet body of the mat by reason of the hole circumferentially gripping the pin with a resulting tendency to follow the pin. Also, the hole so formed is not clean because some of the fibers adhere to the pin and follow it to some extent before being pulled away. This leaves a ragged surface to define the hole.

In order to avoid such ragged surface of the hole to be formed, it has been found that rotation of the pin for at least 90° before any withdrawal, separates the surface of the pin from adhering fibers, and thus minimizes raggedness of the hole. Furthermore, it has been found that by additionally rotating the pin as it is withdrawn, the raggedness of the hole is completely eliminated, and a well defined hole is formed.

Since the hole is formed by laterally compressing the fibers, the periphery of the hole at the surface of the mat exerts the greatest lateral pressure on the pin. This pressure is sufficient to induce delamination of an exposed top layer of the wet mat on withdrawing the pin, both when the pin is rotated and when it is not rotated during the withdrawing process. To avoid such lifting of the surrounding fibers on withdrawing a pin, a holding collar is provided about the pin to position the top surface of the mat around the pin against such uplift. Preferably, such collar is provided as a platen perforated with a multiplicity of holes, one for each pin, and each pin is axially movable and rotatable in its collar, or its hole in the platen.

The diameter and contour of the hole may be varied according to desire and acoustic requirements, as may be the depth and the spacing or other arrangement of the holes. However, in general, the pin employed is an axial pin having a common axis for the penetration and withdrawal, and for rotation of the pin. The pin is pointed for ready penetration and the point lies in said axis. The pointed end is tapered as a form of revolution about said axis. The taper may be conical or of other form, provided it has a suitable taper for withdrawing. A cylindrical section at the penetrating portion of the pin may be present near or at the mat surface, but preferably it is very short or is avoided, since the holding force of the collar is dissipated with depth inwardly from the surface.

The preferred practice is to mount a gang of like pins and to provide for rotating each pin continuously. The pins so mounted for rotation are associated with collar-forming means, such as a platen suitably perforated to provide sliding bearings or collars, for the pins through which the pins are mounted to move axially. The collars, or platens in preferred practice, are accordingly placed on the surface of the wet mat, and the rotating pins are moved axially to penetrate the mat, and then withdrawn. The continuous rotation is not necessary, but only preferred. The pins need not rotate on penetrating the mat, and they need not rotate on being withdrawn from the mat, but they should be rotated at least 90° and preferably more, while at the depth of penetration in order to free the embedded surface of the pin from the fibers resultingly pressed against the surface of the pin by forming the hole. After the pin has been rotated and then sufficiently raised to clear the walls of the resulting hole, the collars, or platen, may be withdrawn.

Where there is no coating composition on the wet mat, practically any type of material may be provided to fix or position the surface to be perforated since there is no tendency for the collars or platen to adhere to such a mat surface. Where there is coating composition on the board, the character of the mat-positioning surface of the platen or collar must be such as to resist adherence of the wet coating. Polished metal has little tendency to stick to the aqueous coatings having pigment, as described in Patent No. 2,409,628. Such coatings are usually low in content of binder and high in content of pigment so that the wet coating is not adhesive in character. The binder is such that it is not of the tacky or sticky type as present in the wet coat, but rather such that its dried residue in the coat becomes the bonding agent for pigment to fiber, and between pigment particles.

There is a tendency for the lateral pressure from the pin to force some of the mat upwardly as a circular bulge about the pin. This depends directly upon the density of the mat, the size and shape of the hole to be formed, and the speed of forming the hole. The fibers displaced to form the hole must find new locations, and hence must slip on others, and move others. Where the tendency is so great that any resulting ridge does not shrink to the desired degree on drying, as determined by ultimate appearance desired, the bulging may be avoided in the preferred practice of the invention. This involves placing the collar or platen on the mat surface before pushing the pin into the mat.

The wet mat may be made by any process in which fibers, binder and water are brought together in a suitable felted structure to be dried to form the desired bonded dry felt. The conventional and preferred process for doing this is graphically indicated in Fig. 1. Fibers 10 and water 11 are brought together in a slurry which may be hydrated at 12 to provide a bonding agent in the conventional manner. The furnish so obtained may or may not be treated to introduce a water-resistant wax for the final structure. When this is done a suitable quantity of aqueous emulsion of wax, such as paraffin, indicated at 13, is added to the furnish and when uniformly distributed therein is suitably precipitated onto the fibers, as by the addition of alum 14. The furnish of fibers so wax-sized or not, is indicated at 15. The fiber furnish is then felted on a suitable forming machine, a conventional manner being indicated at 16, which process involves draining away water at 17 and pressing at 18 to dewater and densify. The resulting wet mat is preferably such that it dries to form a rigid porous structural board, and necessarily for acoustic purposes it is of such density that the resulting board has porosity. Where the dried sheet to be formed is to have a coat as above mentioned, an aqueous coating composition 19 is applied at 20 to the wet mat, preferably in one of the ways described in the above mentioned Patent No. 2,409,628. This forms a wet mat 21 with a wet pigment coat 22 containing an agent which, when dry, bonds the pigment particles to each other and to the fibers of the mat. The wet mat without such coating is designated by the numeral 23 in Fig. 1. The mats 21 or 23 are then perforated according to the present invention as indicated at 24, and then dried at 25.

In Fig. 2 the wet mat 30 representative of mats 21 or 23 and hence coated or not, is indicated in position about to be pierced by a pin 31 placed above it. The pin 31 is a cylindrical pin having a conical end 32. About the cylindrical portion of the pin 31 is means providing a collar, preferably as a bearing, axially slidable on the pin 31.

Fig. 3 shows the parts illustrated in Fig. 2 moved by action to cause the pin 31 to penetrate the wet mat 30, to an extent to bring the conical end wholly within the mat but a slight penetration at the region 34 of the cylindrical portion of pin 31. In this position, which is repeated in Fig. 4, the pin is rotated at least 90° as indicated by the arrow 35. The rotation may be more than 90°, and it may be a continuous rotation which may exist in the positions of Fig. 2 and Fig. 3, if desired, as well as in Figs. 4, 5, 6 and 7.

Fig. 5 shows the parts of Fig. 4 after stopping the described rotation, or during the said continuous rotation, but with the collar 33 moved along the pin to contact the penetrated surface of the mat 30, thus to position the surface of the mat against uplift. Then the pin 31 is withdrawn from the mat by sliding it upwardly through the collar 33 as shown in Fig. 6. This leaves a clean hole 36 in the mat and an unimpaired felted structure surrounding the hole. Then the collar 33 is again slidably moved along the pin 31, as in Fig. 7, to the original relation of the parts shown in Fig. 2, thus exposing the hole 36.

It will be understood that this operation is preferably accomplished by apparatus having a multiplicity of pins and corresponding collar parts 33, which may be a common member in the form of a platen as described.

In order to avoid timing operations which could include holding the pins stationary, rotating the pins, and again holding the pins stationary, it is preferred to have a gang of pins mounted in a device in a manner to maintain all of the pins constantly in rotation. The operation of piercing a wet mat is effected by more simple mechanisms and controls when the pins constantly rotate.

In Fig. 8, the wet mat to be pierced is indicated at 40. Above it is a device, of which a fragment is shown in cross-section, and in which is mounted a multiplicity of similar pins 41. These pins are pencil-like in structure with pointed ends 42, tapered sides 43, preferably conical, which tapered sides are surfaces of revolution about the axes of the pins 41. Each pin 41 is mounted in and moved vertically by a bearing plate 45. On the top of the plate there is a grooved collar 46 forming a pulley fixed to the pin, as by a set screw 47. The bottom surface of the collar 46 is a bearing surface on the plate 45. It is understood that at this bearing surface a suitable ball-bearing structure may be included, if desired. The collar is grooved at 49 for the receipt of a suitable belt 50. Preferably the groove and belt are circular. The belt 50 may be one or more of such belts variously entwined between like pulleys on all the pins 41 of the gang, to keep them all in continuous rotation. Below the plate 45 is a second collar 52 fixed rigidly to the pin 41 as by a set screw 53. The upper face of collar 52 bears against the underface of the mounting plate 45. Thus, raising and lowering of the plate 45 moves the rotating pins vertically as required for penetrating the wet mat and for withdrawing the pins thereafter.

The lower ends of the pins 41 below the plate 45 pass through a second plate 55, having an opening 56, in which the cylindrical pin 41 rotatably bears and is axially movable. Thus, the plate 55 in the region around each pin provides a holding surface to press upon the wet mat 40 for the purposes described. If desired, the thickness of the plate 55 may be considerably reduced and its bearing functions retained by having on the upper face a gang of bearing structures 58. These may have a ball-bearing relation with the pins, if desired.

Figs. 9 through 12 show the manner of operating the parts described in Fig. 8, only one pin of the gang being illustrated. The operation is not necessarily in the sequence illustrated, but the preferred operation is described because it meets all of the contingencies which will be encountered, especially the possibility of an upward bulge when penetrating an unconfined face of the mat 40. Consequently, the preferred practice is to move the entire device carrying the rotary pins, including the plates 45 and 55 in the mutual relation shown in Fig. 8, so that the lower plate 55 comes to rest on the mat to be pierced, as shown in Fig. 9. Then, with the pin 41 still in rotation, the plate 45 is lowered to force the pin 41 into the mat 40. Preferably, the parts are so arranged that the collar 52 strikes the collar 58 as a stop to control the depth of penetration, as shown in Fig. 10. When the pin has reached its depth of penetration, and even with moderate speeds of rotation, the pin will have turned at least 90° before the beginning of the withdrawal movement.

Fig. 11 shows the parts after the pin 41 has been withdrawn by raising plate 45. During the withdrawal, the plate 55 remains on the face of the mat 40. The plate 45 is thus moved away from the plate 55, thereby withdrawing the pin. This leaves a hole 60 with a clean defining wall as the result of the wiping or centrifugal action effected by rotating the pin. The plate 55 is then moved upwardly to the position of Fig. 8, and this is generally illustrated in Fig. 12, which shows the wet mat 40 with the cleanly formed hole 60 therein.

Attention is directed to the fact that in preferred operation the parts are so arranged that the base of the conical end of the pin 41 is below the penetrated face of the mat 40. This causes the cylindrical portion of the pin 41 to enter and in part form the hole. The particular advantage of having the hole cylindrical for a minor extent near the mat surface lies in the fact that some felts of the character pierced for acoustic purposes have a surface texture of mottled character, with high and low spots therein for a pleasing decorative effect. Where such a surface is used it is important that the cylindrical portion of the holes be long enough to exist in those portions of the board which are the thinnest. Thus, the holes as presented at the mottled surface are uniform in diameter. Were all of the holes conical from the apex to the surface of the board, a board having varying thicknesses as described, would present the appearance of holes having different diameters and such effect is unattractive.

From the foregoing it will be appreciated that the process may be carried out simply by many mechanical means which may be devised to operate upon one or more of the principles herein disclosed. Where a wet mat is made, as it is in a conventional manner, by continuous machines, the web of the mat travels at moderate speeds. Just as cross-cutting devices are made to operate upon a moving web of wet mat by travel lineally with the web while crossing the web, so may gang devices of the present invention be similarly arranged to move with the web of wet mat while functioning as described.

Consequently, it will be understood that the invention concerns primarily process and secondarily apparatus therefor, as set forth in the accompanying claims.

We claim:

1. The method which comprises forming a wet structural-board-forming mat by felting from an aqueous slurry of fibers, said mat being such as to form a rigid porous board on drying, penetrating said wet mat at one face by axial movement of a multiplicity of pointed smooth-sided pins each presenting at the pointed end a tapered surface of revolution about the axis for said penetration and forming in the mat a multiplicity of inwardly tapered holes for acoustic purposes in the resulting dry board, positioning that portion of the surface of the mat which lies around each of said pins against uplift on withdrawing each pin, rotating each pin while at its depth of penetration to the extent of at least 90°, then withdrawing each pin while holding said surface portion so positioned, exposing the penetrated surface, and drying the resulting mat.

2. The method which comprises forming a wet structural-board-forming mat by felting from an aqueous slurry of fibers, said mat being such as to form a rigid porous board on drying, penetrating said wet mat at one face by axial movement of a multiplicity of pointed smooth-sided pins each presenting at the pointed end a tapered surface of revolution about the axis for penetration and forming in the mat a multiplicity of inwardly tapered holes for acoustic purposes in the resulting dry board, positioning that portion of the surface of the mat which lies around each of said pins against uplift on withdrawing each pin, rotating each pin while at its depth of penetration to the extent of at least 90°, simultaneously rotating and withdrawing each pin while holding said surface portion so positioned, exposing the penetrated surface, and drying the resulting mat.

3. The method which comprises forming a wet structural-board-forming mat by felting from an aqueous slurry of fibers, said mat being such as to form a rigid porous board on drying, penetrating said wet mat at one face by axial movement of a multiplicity of rotating pointed smooth-sided pins each presenting at the pointed end a tapered surface of revolution about the axis for rotation and said penetration and forming in the mat a multiplicity of inwardly tapered holes for acoustic purposes in the resulting dry board, positioning that portion of the surface of the mat which lies around each of said pins against uplift on withdrawing each pin, withdrawing each rotating pin while holding said surface portion so positioned, exposing the penetrated surface, and drying the resulting mat.

4. The method which comprises forming a wet structural-board-forming mat by felting from an aqueous slurry of fibers, said mat being such as to form a rigid porous board on drying, applying an aqueous coating composition to one surface of the wet mat to form a layer thereon, said composition in applied undried form being effectively non-adhesive at the exposed surface, penetrating said coated surface by axial movement of a multiplicity of pointed smooth-sided pins each presenting at the pointed end a tapered surface of revolution about the axis for said penetration and forming in the mat a multiplicity of inwardly tapered holes for acoustic purposes in the resulting dry board, positioning that portion of said coated surface of the mat which lies around each of said pins against uplift on withdrawing each pin, rotating each pin while at its depth of penetration to the extent of at least 90°, then withdrawing each pin while holding said surface portion so positioned, exposing the penetrated coated surface, and drying the resulting mat to a coated perforated board.

5. The method which comprises forming a wet structural-board-forming mat by felting from an aqueous slurry of fibers, said mat being such as to form a rigid porous board on drying, applying an aqueous coating composition to one surface of the wet mat to form a layer thereon, said composition in applied undried form being effectively non-adhesive at the exposed surface, penetrating said coated surface by axial movement of a multiplicity of pointed smooth-sided pins each presenting at the pointed end a tapered surface of revolution about the axis for said penetration and forming in the mat a multiplicity of inwardly tapered holes for acoustic purposes in the resulting dry board, positioning that portion of said coated surface of the mat which lies around each of said pins against uplift on withdrawing each pin, rotating each pin while at its depth of penetration to the extent of at least 90°, simultaneously rotating and withdrawing each pin while holding said surface portion so positioned, exposing the penetrated coated surface, and drying the resulting mat to a coated perforated board.

6. The method which comprises forming a wet structural-board-forming mat by felting from an aqueous slurry of fibers, said mat being such as to form a rigid porous board on drying, applying an aqueous coating composition to one surface of the wet mat to form a layer thereon, said composition in applied undried form being effectively non-adhesive at the exposed surface, penetrating said coated surface by axial movement of a multiplicity of rotating pointed smooth-sided pins each presenting at the pointed end a tapered surface of revolution about the axis for rotation and said penetration and forming in the mat a multiplicity of inwardly tapered holes for acoustic purposes in the resulting dry board, positioning that portion of said coated surface of the mat which lies around each of said pins against uplift on withdrawing each pin, withdrawing each rotating pin while holding said surface portion so positioned, exposing the penetrated surface, and drying the resulting mat.

7. The method which comprises forming a wet structural-board-forming mat by felting from an aqueous slurry of fibers, said mat being such as to form a rigid porous board on drying, applying a coating composition comprising an aqueous suspension of pigment particles and a binder therefor to one surface of the wet mat to form a layer of pigment thereon, said binder and said composition being effectively non-adhesive at the exposed surface of said applied undried layer, penetrating said coated surface by axial movement of a multiplicity of pointed smooth-sided pins each presenting at the pointed end a tapered surface of revolution about the axis for said penetration and forming in the mat a multiplicity of inwardly tapered holes for acoustic purposes in the resulting dry board, positioning that portion of the surface of the mat which lies around each of said pins against uplift on withdrawing each pin, rotating each pin while at its depth of penetration to the extent of at least 90°, then withdrawing each pin while holding said surface portion so positioned, exposing the penetrated coated surface, and drying the resulting mat to a coated perforated board.

8. The method which comprises forming a wet structural-board-forming mat by felting from an aqueous slurry of fibers, said mat being such as to form a rigid porous board on drying, applying a coating composition comprising an aqueous suspension of pigment particles and a binder therefor to one surface of the wet mat to form a layer of pigment thereon, said binder and said composition being effectively non-adhesive at the exposed surface of said applied undried layer, penetrating said coated surface by axial movement of a multiplicity of pointed smooth-sided pins each presenting at the pointed end a tapered surface of revolution about the axis for said penetration and forming in the mat a multiplicity of inwardly tapered holes for acoustic purposes in the resulting dry board, positioning that portion of the surface of the mat which lies around each of said pins against uplift on withdrawing each pin, rotating each pin while at its depth of penetration to the extent of at least 90°, simultaneously rotating and withdrawing each pin while holding said surface portion so positioned, exposing the penetrated coated surface, and drying the resulting mat to a coated perforated board.

9. The method which comprises forming a wet structural-board-forming mat by felting from an aqueous slurry of fibers, said mat being such as to form a rigid porous board on drying, applying a coating composition comprising an aqueous suspension of pigment particles and a binder therefor to one surface of the wet mat to form a layer of pigment thereon, said binder and said composition being effectively non-adhesive at the exposed surface of said applied undried layer, penetrating said coated surface by axial movement of a multiplicity of rotating pointed smooth-sided pins each presenting at the pointed end a tapered surface of revolution about the axis for rotation and said penetration and forming in the mat a multiplicity of inwardly tapered holes for acoustic purposes in the resulting dry board, positioning that portion of the surface of the mat which lies around each of said pins against uplift on withdrawing each pin, withdrawing each rotating pin while holding said surface portion so positioned, exposing the penetrated coated surface, and drying the resulting mat to a coated perforated board.

References Cited in the file of this patent

UNITED STATES PATENTS

| Number | Name | Date |
|---|---|---|
| 1,157,754 | Benjamin | Oct. 26, 1915 |
| 1,368,233 | Becker | Feb. 15, 1921 |
| 1,705,780 | Olson | Mar. 19, 1929 |
| 1,946,914 | New | Feb. 13, 1934 |
| 2,068,037 | Osborn | Jan. 19, 1937 |
| 2,096,233 | Ericson | Oct. 19, 1937 |
| 2,281,945 | Milliken | May 5, 1942 |
| 2,323,694 | Ward et al. | July 6, 1943 |
| 2,355,454 | Lucius | Aug. 4, 1944 |
| 2,378,618 | Burt | June 19, 1945 |
| 2,408,488 | Sorensen | Oct. 1, 1946 |
| 2,409,628 | Heritage | Oct. 22, 1946 |
| 2,550,894 | Weisbecker | May 1, 1951 |